(12) United States Patent
Frear

(10) Patent No.: US 6,315,363 B1
(45) Date of Patent: Nov. 13, 2001

(54) GO CART SEAT AND METHOD

(76) Inventor: Charles Frear, 8170 Rose Marie Ave. W., Boynton Beach, FL (US) 33437

( * ) Notice: Subject to any disclaimer, the term of this patent is extended or adjusted under 35 U.S.C. 154(b) by 0 days.

(21) Appl. No.: 09/420,881

(22) Filed: Oct. 19, 1999

(51) Int. Cl.$^7$ .................................................. A47C 7/02
(52) U.S. Cl. ............................. 297/452.12; 297/452.14; 297/452.25; 297/452.34; 297/487
(58) Field of Search .................. 297/452.12, 452.14, 297/452.21, 452.25, 452.34, 452.36, 487, 465

(56) References Cited

U.S. PATENT DOCUMENTS

| | | | |
|---|---|---|---|
| 3,314,721 | * | 4/1967 | Smith ........................ 297/452.14 X |
| 3,596,986 | | 8/1971 | Ragsdale . |
| 3,992,056 | | 11/1976 | Koziatek et al. . |
| 4,291,917 | | 9/1981 | Hawks . |
| 4,367,897 | * | 1/1983 | Cousins ....................... 297/452.25 X |
| 4,484,778 | * | 11/1984 | Cousins et al. ............. 297/452.25 X |
| 4,621,004 | | 11/1986 | Madsen . |
| 5,148,563 | * | 9/1992 | Klearman et al. ............... 297/465 X |
| 5,426,801 | * | 6/1995 | Klearman et al. ............... 297/465 X |
| 5,599,068 | * | 2/1997 | Kelly et al. ................. 297/452.14 X |
| 5,810,438 | | 9/1998 | Newhouse . |
| 5,915,789 | * | 6/1999 | Ponce De Leon, III ........ 297/465 X |
| 5,931,539 | * | 8/1999 | Saiz ...................................... 297/465 |
| 6,045,183 | * | 4/2000 | Weber ................................. 297/487 |
| 6,102,481 | * | 8/2000 | Tateyama .................... 297/452.34 X |

FOREIGN PATENT DOCUMENTS

| | | | |
|---|---|---|---|
| 389587 | * | 9/1908 | (FR) ............................. 297/452.12 |
| 1537611 | * | 8/1968 | (FR) ..................................... 297/487 |
| 6-154057 | * | 6/1994 | (JP) ............................. 297/452.14 |

* cited by examiner

*Primary Examiner*—Peter M. Cuomo
*Assistant Examiner*—Rodney B. White
(74) *Attorney, Agent, or Firm*—David P. Lhota, Esq.; Stearns Weaver Muler Weissler Alhadeff & Sitterson, P.A.

(57) ABSTRACT

A one-piece molded go cart seat having a back, bottom and sides wherein the sides are deepened and partially overlay the rib cage with a partial wrap portion that supports the sides and a partial portion of the front of the rib cage. The lateral edges include a webbing or binding made from a non-chaffing material. A method of the making the go cart seat comprises utilizing a two piece mold having flanges at a parting point and mudding the point of separation to provide a smooth rib running along the vertical axis of the top of the back to the bottom of the seat portion.

20 Claims, 4 Drawing Sheets

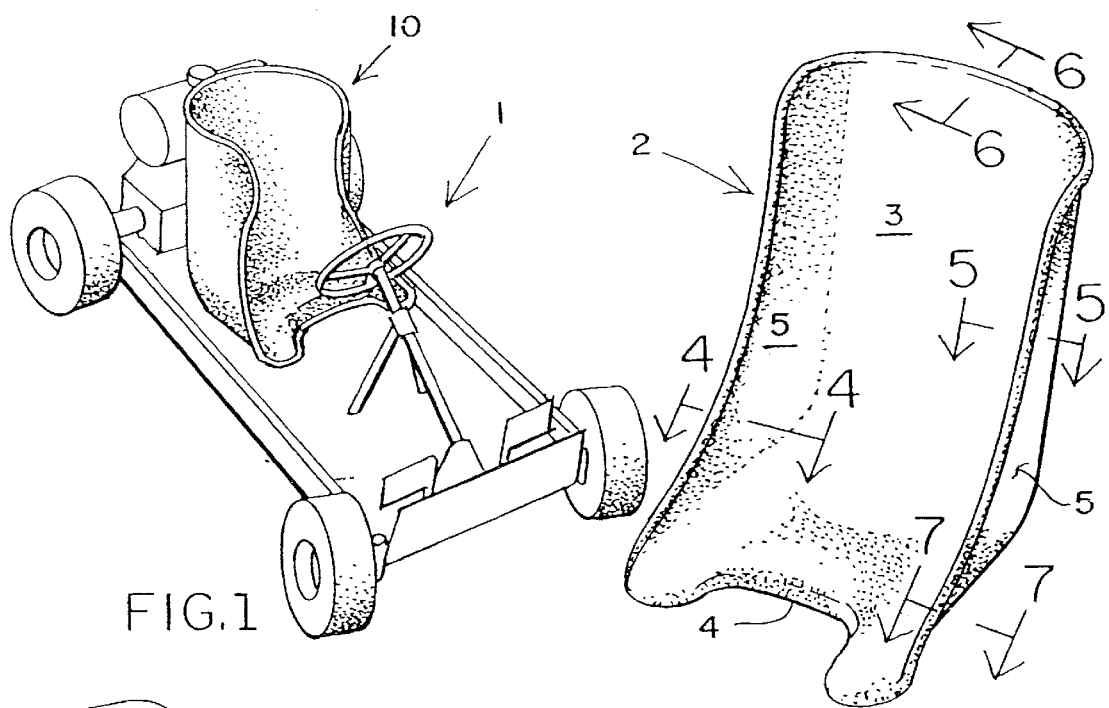
FIG.1
FIG.2 (PRIOR ART)
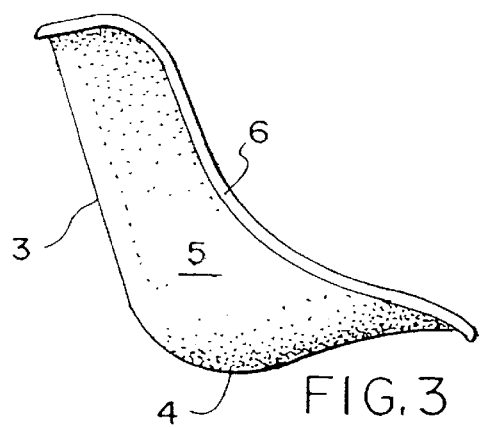
FIG.3 (PRIOR ART)
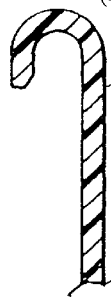
FIG.4 (PRIOR ART)
FIG.5 (PRIOR ART)
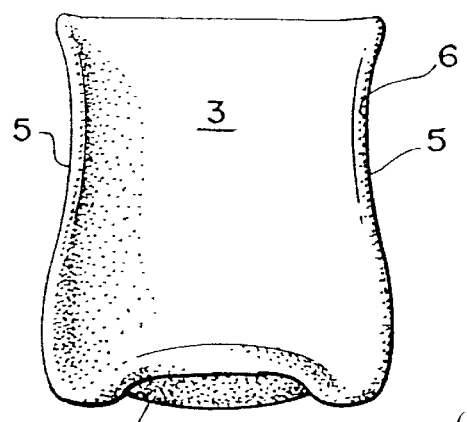
FIG.8 (PRIOR ART)
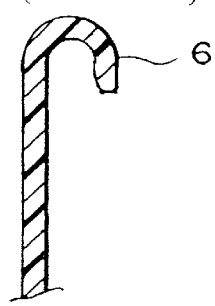
FIG.6 (PRIOR ART)
FIG.7 (PRIOR ART)

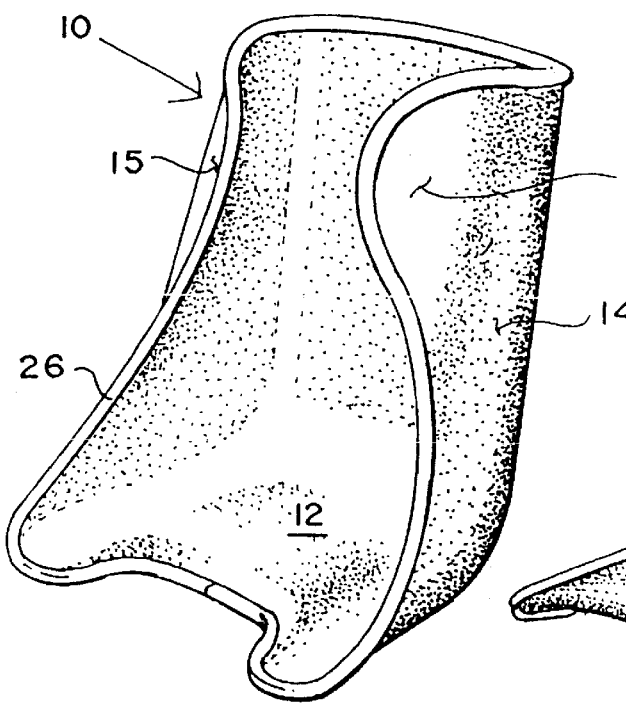
FIG. 9
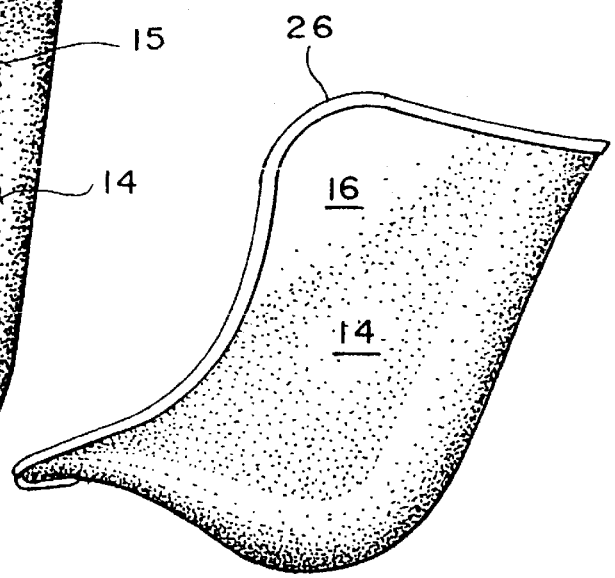
FIG. 10
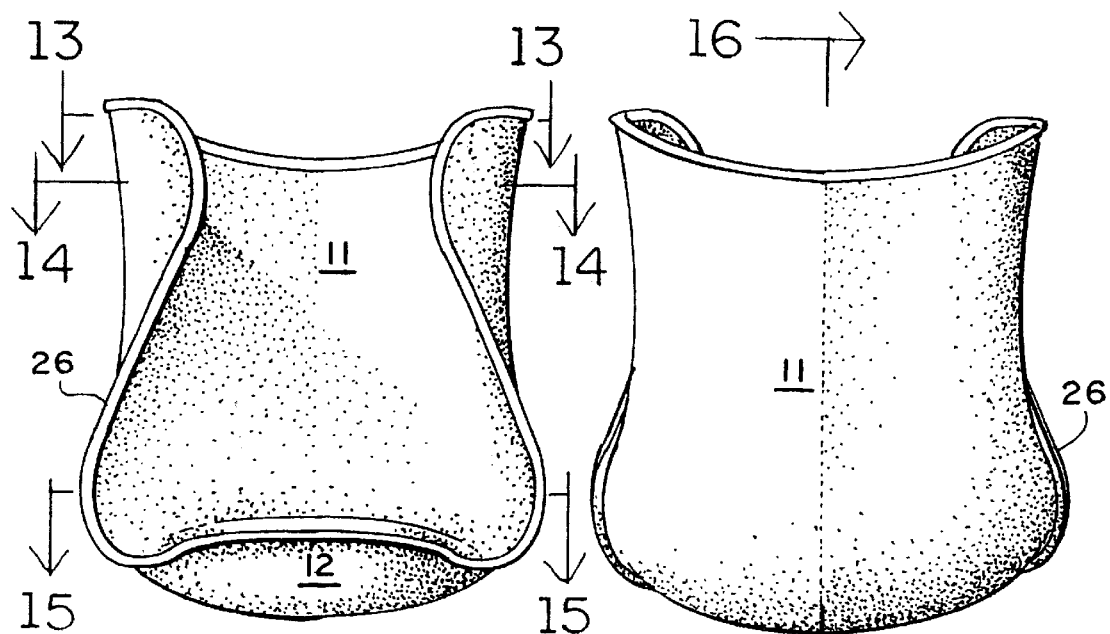
FIG. 11
FIG. 12

GO CART SEAT AND METHOD

FIELD OF THE INVENTION

The present invention relates to seating for go carts of the type employing small engines, wide track and wheel base, no spring suspension, and affordability.

BACKGROUND OF THE INVENTION

Seats traditionally employed in go carts are in an environment where no other restraint is applied on the driver, such as lap belts, shoulder belts, air bags, and other restraints. The prior art seats are basically formed from a fiberglass like material which can be woven, matted, or chopped. The typical prior art seat is illustrated in FIGS. 2 through 8. There it will be seen that the side portions are relatively narrow, and curve along with the junction between the back and the bottom. The edges of the seat are also formed with a reverse curve which provides a chaffing point when contacted from the exterior portion of the seat, particularly by the underneath portion of the upper arm or even the forearm and the elbow areas. The depth of the seat is limited, and there is virtually no support around the rib cage portion. As a result, the driver, particularly when cornering or otherwise experiencing lateral G's or thrust, will hold on to the wheel for purposes of staying in the seat, as distinguished from devoting his strength and coordinated effort to manipulating the vehicle. In addition, the side thrust on the abdomen and rib cage causes the side edges to dig into the body involving further discomfort. Finally, when resting the forearm on the lower side portions the arm can overlap the edge and be chaffed by the J-shaped or reversely curved interior portion.

As a result of the above, it is highly desirable to produce a go cart seat which will provide for superior and yet comfortable support of the upper portion of the body, provide for support overlapping the rib cage portion of the driver, and eliminate the chaffing potential of the reversely curved lateral edges. Car seats, for go carts, are not necessarily seen in the prior art. Exemplary of Patents relating to one-piece molded seating structure are U.S. Pat. No. 3,596,986 and 5,810,438. Another typical example is U.S. Pat. No. 4,621,004 which relates to an insert utilized in a one-piece molded seat.

SUMMARY OF THE INVENTION

The present invention is directed to a car seat with three components, primarily in a one-piece molded car seat having a back, bottom, and sides. The first inventive feature is directed to deepening the sides to effectively overlay the lateral portion of the rib cage. The second feature relates to providing a partial wrap around portion offering support to the sides and partial portion of the front of the rib cage. The third feature relates to providing a webbing or binding around the lateral edges which is of a non-chaffing material, and eliminates the reversely folded portion of the prior art. In addition, the subject car seat can be worn with a rib cage protector which is something like a thin life jacket which encircles the rib cage. With the invention is the concomitant sizing to accommodate approximately six sizes. Finally, the invention also contemplates the method of utilizing a two piece mold having flanges at the parting point and then mudding the point of separation of the two halves in order to make a smooth rib running along the vertical axis of the top of the back to the bottom of the seat portion.

It is a principle object of the present invention to provide a go cart seat which enhances the support of the driver, provides more comfort to the driver while cornering or during the acceleration or deceleration phase, while at the same time enhancing the lateral support of the driver, and reducing the chaffing which can occur underneath the arms based upon contacting the side edges.

A further object of the present invention is to provide a go cart seat with the capability of very prompt retrofit into virtually all go carts of generally accepted construction.

Yet another, and not conclusive, object of the present invention is to provide a go cart seat affording the above advantages with the basic economics of manufacture which permit it to be sold at an affordable price as a retrofit, or as the original equipment.

DESCRIPTION OF THE DRAWINGS

Further objects and advantages of the present invention will become apparent as the following description of an illustrative embodiment takes place in conjunction with the accompanying illustrative drawings in which:

FIG. 1 is a perspective view of a typical go cart employing a seat illustrative of the present invention by way of retrofit, or new manufacture;

FIG. 2 is a perspective view of the front of the prior art cart seat;

FIG. 3 is a side elevation of the prior art cart seat;

FIG. 4 is a sectional view taken along section line 4—4 of FIG. 2, illustrating in enlarged form the configuration of the lateral edge;

FIG. 5 is a view comparable to that of FIG. 4, but taken along section line 5—5;

FIG. 6 is a further section line taken along section 6—6 of FIG. 2;

FIG. 7 is similar taken along the curvilinear portion of FIG. 2 where the side moves forward;

FIG. 8 is a front view of the prior art seat;

FIG. 9 is a perspective view of the car seat illustrative of the present invention;

FIG. 10 is a side view of the left side of the car seat shown in FIG. 9;

FIG. 11 is a front elevation of the improved car seat which is shown in perspective in FIG. 9;

FIG. 12 is a rear view of car seat shown in FIGS. 9, 10 and 11;

DESCRIPTION OF THE ILLUSTRATIVE EMBODIMENTS

Figure 13:
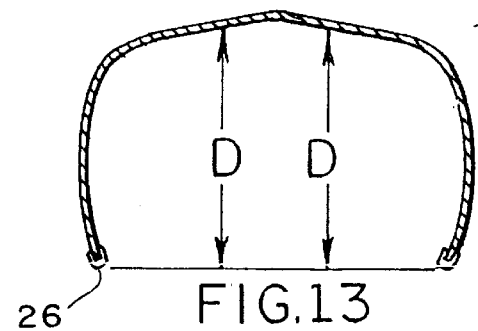
FIG. 13 is a transverse sectional view of the subject seat taken essentially along section line 13—13 of FIG. 11.

The Prior Art:

The present invention will be best understood in the context of an understanding of the structure of a prior art car seat. The go cart 1 shown in FIG. 1 is illustrative of the basic elements of a go cart in which the seat of the present invention finds its improved characteristics maximized.

FIG. 2 is a front perspective view of the prior art seat 2 showing the back 3, the bottom 4, the sides 5 and the edges 6. FIG. 3 is a side view of the right side 5 of the prior art seat 2. In FIGS. 4 and 5, slices along the lateral edges taken along section line 4—4 and 5—5 of FIG. 2 illustrate the prior art reversely folded edges which edges can chafe the under portion of the arm of the driver. FIG. 6 is a transverse sectional view taken through the lateral edge along section line 6—6 of FIG. 2. FIG. 7 is a further transverse projected view taken along section line 7—7 of FIG. 2. FIG. 8 is a front elevation of the car seat 2, also showing the back 3, bottom 4, sides 5, and the edges 6.

Figure 14:
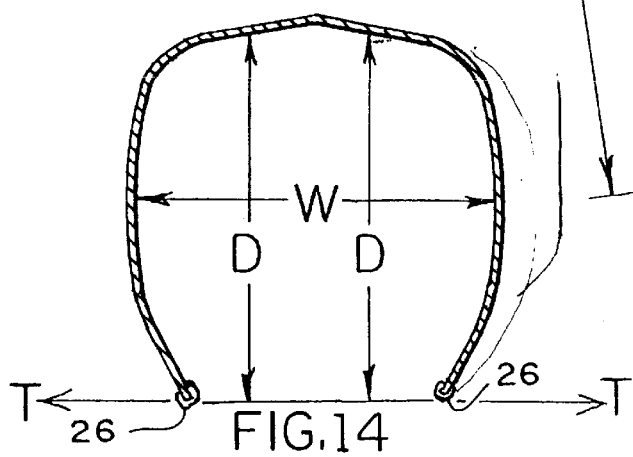
FIG. 14 is taken along section line 14—14 of FIG. 11 and shows the section line beneath that of FIG. 13 and further showing the closure of the forward portion of the seat.
Figure 15:
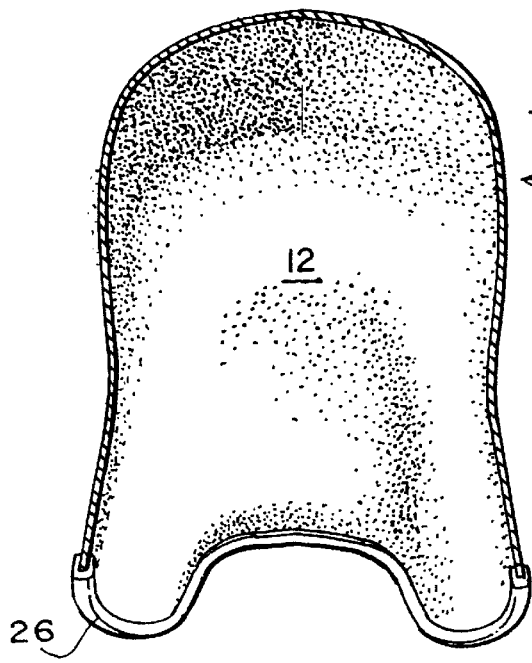
FIG. 15 is a further transverse sectional view the seat taken at the lower portion thereof along section line 15—15 of FIG. 11, and shows the inside bottom of the seat.

Particularly as shown in FIG. 14, which is to be contrasted with FIG. 3, the improved car seat 10 has a back 11 (here see also FIG. 13), a bottom 12, sides 14, and a partial rib cage wrap 15. The rib cage wrap portion 15 is not present in the prior art seat 2, shown in FIGS. 2 through 8 inclusive. To be noted is the depth 16 which is related to the height 18 in a ratio significantly different from the prior art, namely the depth 16 is at least 33 to 66% of the height of the seat. Also as shown, particularly in FIG. 13 as well as FIG. 15, the rib cage 15 extends to a point where there is a substantially more than 180° of wrap around the body afforded by the back 11, and sides 14. Ideally, the wrap is 180° through the sides and then an over wrap of anywhere from 15° to 30° which is the function of the curvilinearity of the rib cage 15.

Figure 18:
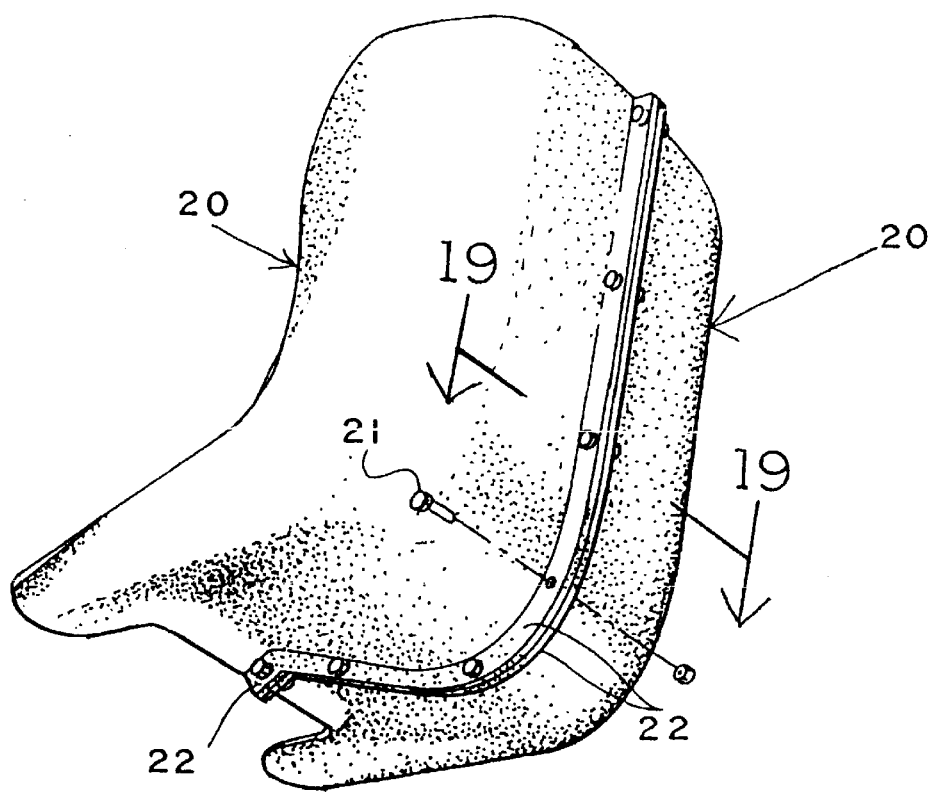
FIG. 18 is a partially perspective rear bottom view of the mold used in the method of forming the subject seat.
Figure 19:
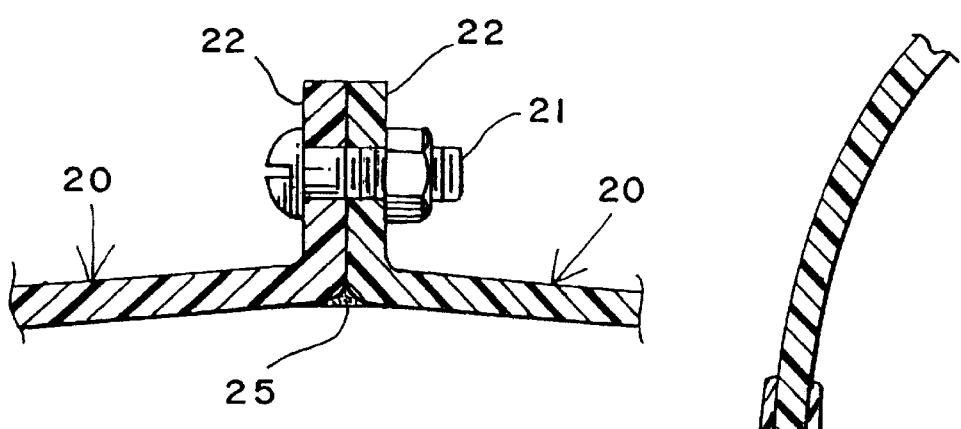
FIG. 19 is a partial enlarged section view of the joint of the two halves of the mold taken along section line 19—19 of FIG. 18.
Figure 20:
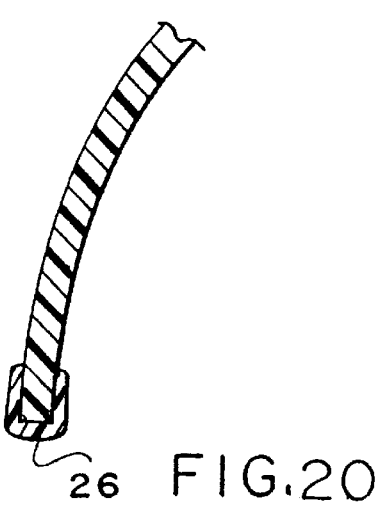
FIG. 20 is an enlarged partial section view taken along section line 20—20 of FIG. 16 illustrating the finished edge secured at the edges of the illustrative car seat.

While dimensions are not to be considered as limiting, they are illustrative of the various sizes with which the invention deals and more particularly the ratio of height to depth, and the extent of the angular engagement provided by the rib cage 15. The sizes intended are approximately six in number. Each size is set forth below in a table indicating the ranges of the various portions. As shown in cross-sectional detail in FIG. 18, it will be seen that the edge portion of the entire periphery of the improved car seat 10 has had a finish applied to it to eliminate the rough edge chaffing otherwise caused by the reversely bent edges of the car seat 2 of the prior art. While it is being shown here as a wrap around type binding, heat flashing, burnishing, or thin film materials are contemplated for providing the finished edge 26 for the improved car seat 10.

Figure 16:
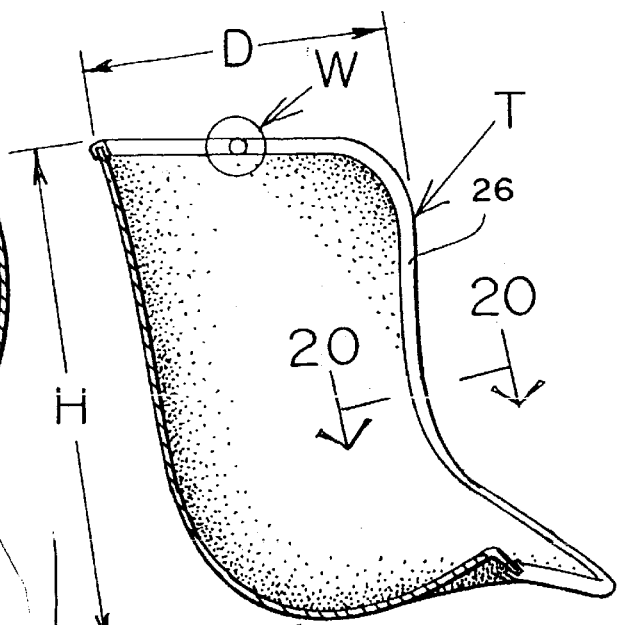
FIG. 16 is a vertical sectional view of the illustrative car seat taken along section line 16—16 of FIG. 12.

The following six (6) sizes are contemplated wherein the dimensions shown are height, depth, width, and angular wrap. The angular wrap remains constant between 15° and 30°. The height is taken from where the height is as shown in FIG. 16; the depth is as shown in FIG. 13 and 14; and the width is shown primarily in FIG. 14.

TABLE OF DIMENSIONS

| SIZE | HEIGHT TOP OF BACK TO TOP SIDE OF SEAT | DEPTH | WIDTH | ANGULAR WRAP |
|---|---|---|---|---|
| 1 | 18" | 8" | 12" | 15–30° |
| 2 | 19" | 8½" | 13" | 15–30° |
| 3 | 20" | 9½" | 14" | 15–30° |
| 4 | 20" | 9½" | 15" | 15–30° |
| 5 | 20" | 9½" | 16" | 15–30° |
| 6 | 20" | 9½" | 17½" | 15–30° |

Present invention height to depth ratio 3:1 to 1.5:1 (or ⅓–33% to ⅔–66%) depth to height.

Prior art is 15% to 25% depth to height.

An additional property, but not a dimension, is the tension load that is resisted by the rib cage wrap. It is shown in FIG. 14 as T. The amount of flex, in order to open up the wrap to a portion where it is no longer essentially an overlap portion, approximates 20 pounds on each side as measured by the pull of a typical fish scale when the seat itself is constraint physically.

METHOD OF THE INVENTION

Figure 17:
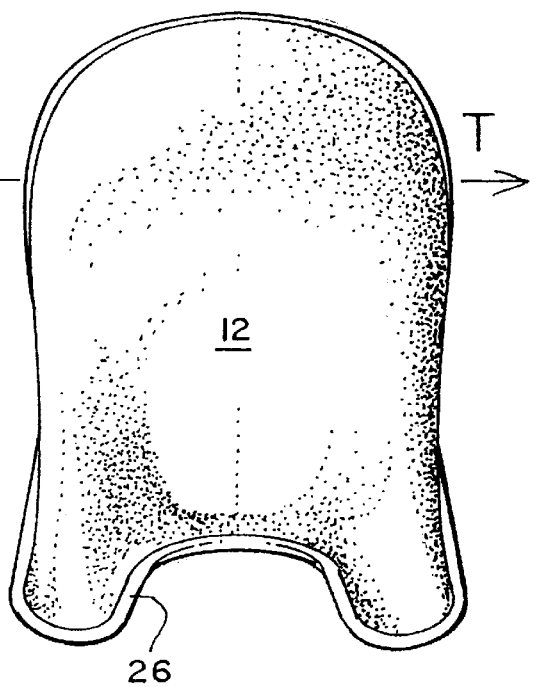
FIG. 17 is a bottom view of the subject illustrative car seat.

The method is best illustrated in FIGS. 16 and 17 where it will be seen that the mold halves 20 are provided with intersecting flanges 22 secured together by bolt assembly 21. In order to reduce the tendency to forming a parting line, the joint between the flanges 22, as shown in FIG. 17 are filled with a mud 25 prior to laying up the fiberglass body of the car seat 10. In this connection it will be appreciated that various forms of build-up can be employed, essentially the same as utilized in boat building and outdoor furniture building. However, highly desirable is a matted material and a woven material as distinguished from chopped fiber used in the lay up. None the less chopped fiber with a polyester resin will form an acceptable seat.

It will be understood that various changes in the details, materials and arrangements of parts, or method which have been herein described and illustrated in order to explain the nature of the invention, may be made by those skilled in the art within the principle and scope of the invention as expressed in the appended claims.

What is claimed is:

1. A seat for use in a go cart for protecting the rib cage of the driver, said seat comprising:

a body which has a bottom, a back, and opposing sidewalls;

said bottom having a configuration to accommodate the buttocks and the forwardly extending leg portions of the driver;

said back having a predetermined width and extending upwardly from said bottom to a peripheral edge a predetermined distance for supporting the driver's back; and said opposing sidewalls extending forward from said back to opposite peripheral edges and having at least a section between an upper end and said bottom that curves inward and downward to define a distance between said opposite peripheral edges that is less than the width of said back to provide a partial rib cage portion that overlaps at least a portion of the driver's ribs.

2. A seat as recited in claim 1, further comprising:

means for making said peripheral edges substantially smooth.

3. A seat as recited in claim 1, wherein said opposing sidewalls diverge outward and downward from said section toward said bottom such that said sidewalls are at least partially concave between said upper end and said bottom.

4. A seat as recited in claim 1, wherein said bottom further comprises two extensions protruding outward and downward from said bottom proximal said opposing sidewalls for supporting the driver's legs.

5. A seat as recited in claim 1, further comprising an interior surface comprising a rough finish to prevent slipping while driving.

6. A go cart seat for protecting the rib cage of a driver, said seat comprising:
   a back having a peripheral top edge, the back extending upwardly from a bottom, opposing sidewalls separated by said back and bottom and extending upward from said bottom and along said back to an upper end; and
   said opposing sidewalls extending outward from said back to opposite peripheral edges and converging inward and downward, narrowing the distance between said opposite peripheral edges toward a midsection to form a partial wrap around the rib cage of the driver, said opposing sidewalls diverging outward and downward from said midsection toward said bottom, expanding the distance between said opposite peripheral edges.

7. A seat as recited in claim 6, said peripheral edges having a finished edge essentially devoid of sharp edges to avoid chaffing the under portion of the arm of the driver.

8. A seat as recited in claim 6, wherein said bottom further comprises two extensions protruding outward and downward from said bottom proximal said opposing sidewalls for supporting the driver's legs.

9. A seat as recited in claim 6, further comprising an interior surface comprising a rough finish to prevent slipping while driving.

10. A seat as recited in claim 6, wherein said opposing sidewalls further comprises a depth and said back having a height defining a depth to height ratio in which the depth is approximately between ⅓ and ⅔ and of the height.

11. A go cart seat for protecting the rib cage of a driver, said seat comprising:
    a back having a predetermined width and a top edge, the back extending upwardly from a bottom, two opposing sides extending upward from the bottom and along the back to said top edge, said opposing sides each having a peripheral edge; and
    a rib cage portion defined by said sides wherein said sides have at least a midportion between said top edge and said bottom that tapers inward and downward such that the distance between said peripheral edges along said midportion is less than the width of said back to partially wrap around the rib cage of the driver.

12. A seat as recited in claim 11, wherein
    said top edge and peripheral edges comprise a finished edge essentially devoid of sharp edges to avoid chaffing the driver.

13. A seat as recited in claim 11, wherein said bottom further comprises two extensions protruding outward and downward from said bottom proximal said opposing sidewalls for supporting the driver's legs.

14. A seat as recited in claim 11, further comprising an interior surface comprising a rough finish to prevent slipping while driving.

15. A seat as recited in claim 11, wherein the angular wrap of the rib cage portion exceeds 180° on each side with reference to said back such that the distance between said peripheral edges along said midportion is less than the width of said back.

16. A go cart seat for protecting the rib cage of a driver, said seat comprising:
    a back having a top edge, the back extending upwardly from a bottom, opposing sides extending upward from the bottom an along the back toward said top edge; and
    a rib cage wrap portion defined by said opposing sides converging inward and downward below said top edge toward a midsection and diverging outward from said midsection toward said bottom to form a partial wrap around the rib cage of the driver.

17. A seat as recited in claim 16, further comprising:
    lateral edges defined by said bottom, back, sidewall portions, and rib cage wrap portion having a finished edge essentially devoid of sharp edges to avoid chaffing the under portion of the arm of the driver.

18. A seat as recited in claim 16, wherein said bottom further comprises two extensions protruding outward and downward from said bottom proximal said opposing sidewalls for supporting the driver's legs.

19. A seat as recited in claim 14, further comprising an interior surface comprising a rough finish to prevent slipping while driving.

20. A set as recited in claim 16, wherein said opposing sides have a depth and said back has a height, said depth being approximately between ⅓ and ⅔ of the height; and wherein the rib cage wrap exceeds 180° on each side.

\* \* \* \* \*